United States Patent Office
3,780,192
Patented Dec. 18, 1973

3,780,192
CURING OF MEATS
Wilson E. Danner, Linden, Paul A. Hammes, Westfield, and Charles W. Everson, Warren, N.J., assignors to Merck & Co., Inc., Rahway, N.J.
No Drawing. Continuation-in-part of applications Ser. No. 98,484, Dec. 15, 1970, and Ser. No. 314,896, Dec. 13, 1972, both now abandoned. This application Mar. 27, 1973, Ser. No. 345,429
Int. Cl. A23b 1/02; A23l 3/34
U.S. Cl. 426—266     4 Claims

ABSTRACT OF THE DISCLOSURE

The curing of meats with a nitric oxide curing medium and an enediol or a diketone reducing agent in the presence of iron or an iron salt accelerates the curing and affords a meat product of improved color and color stability.

CROSS REFERENCE TO RELATED APPLICATIONS

This application is a continuation-in-part of U.S. Ser. No. 98,484, filed Dec. 15, 1970, now abandoned, and copending application Ser. No. 314,896, filed Dec. 13, 1972, now abanboned.

BACKGROUND OF THE INVENTION

The usual curing of meat products now empolys a mixture of sodium or potassium nitrate and/or nitrite and a reducing agent such as sodium ascorbate or iso-ascorbate with the addition of sodium chloride, sugar and spices. The nitrate and/or nitrite become reduced in the meat to nitric oxide which then serves to convert the myoglobin to the desired red or pink nitrosomyoglobin. This is the curing process. The reducing agent materially shortens this curing time as it more rapidly converts the nitrite to the nitrous acid which, in turn, yields the necessary nitric oxide for chemical conversion of myoglobin to nitrosomyoglobin.

In carrying out this curing, two basic methods are employed. In the first method, the so-called "dry cure" process, a dry mixture of the curing agent is rubbed on the surface of the meat and the meats are allowed to stand until the agents penetrate through the interior of the meat by diffusion and are uniformly distributed. Thus, bacon is commonly cured by this method and it requires a period of fifteen to thirty days to effect a completely uniform cure. In the case of comminuted meats such as sausage, the dry curing agents are simply mixed with the ground meat. In some instances, heat is applied to accelerate the cure and also to at least partially cook the meat.

In the second general method, the curing agents are dissolved in water to form a so-called "pickle" in which the meats are soaked; the curing being effected by the diffusion of the pickling solution through the meat. It is also common practice to inject a pickle solution into the vascular system of certain cuts of meat to effect a more rapid diffusion of the curing agents. Alternatively, the pickle can be injected directly into the meat itself, thus shortening the time necessary to effect complete curing. Also, a combination of pickle injection and soaking procedures can be used.

The U.S. Pat. 2,831,774 discloses a process for improving the color of meat by subjecting the meat material to contact with a ferrous salt in an amount sufficient to increase the ferrous iron concentration to about 30–300 parts per million. In the described process the ferrous salt solution is added to the meat emulsion which is then cured using sodium nitrite or a nitrite producing salt but in the absence of an enediol compound or a diketone reducing agent.

SUMMARY OF THE INVENTION

In accordance with this invention, it is now found that the curing of meats with a nitric oxide curing medium and an enediol or a diketone reducing agent is improved when it is carried out in the presence of added iron or an iron salt. Then iron or iron salt acts synergistically in the presence of a reducing agent to accelerate the curing process and to produce a cured product of improve color. Also, the amount of reducing agent can be lowered when the curing is carried out by the process of this invention. In addition, the cured meat product produced in this manner is enriched in iron and has improved color stability.

Thus, the invention can be applied to whole or primal cuts of meat such as hams, bellies, shoulders loins, briskets, rounds and flanks and to comminuted meat such as ordinary sausages and the more specialized frankfurters, bolognas and the like which are enclosed in the casing. The encase sausages may be of the fermented, dry or semi-dry types.

The addition of from 0.0002% to 0.05% (preferably 0.002% to 0.02%) of elemental iron as such or derived from iron salts, based on the weight of the meat, in the presence of an enediol or diketo reducing agent, serves to accelerate the development of the cure color, or the formation of nitrosomyoglobin, in the meat. Tests have shown that the added iron enhanced the stability of the nitrosomyochrome in the cooked meat. This phenomenon has especial utility in enhancing the stability of the cured color in pre-packaged meats displayed in illuminated cabinets in supermarkets.

In general, the preferred form of iron is a ferrous salt over a ferric salt. The ferric form, in turn, appears to be somewhat more effective than reduced, or metallic iron. In the case of the latter, the more finely divided products are to be preferred over coarser material.

The ferrous salts include, as examples, $FeSO_4$, $$FeSO_4 \cdot 7H_2O$$

ferrous gluconate, $FeCl_2 \cdot 4H_2O$, etc. The ferric salts include $Fe_2(SO_4)_3$, $FeCl_3 \cdot 6H_2O$, $Fe(NO_3)_3 \cdot 9H_2O$, $$FePO_4 \cdot 4H_2O,$$

ferric phosphate soluble, ferric ammonium citrate, etc. The more soluble ferric salts appear to be more effective than do the relatively insoluble compounds.

Any of the reducing agents commonly used or known to be useful for meat curing are employed in this invention. The reducing agents are sodium or potassium ascorbate or erythorbate. Other compounds which have the enediol group

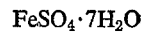

or the diketone group

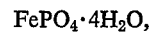

and representative U.S. Patents disclosing them are 2,739,899, Re. 26,040, 3,201,263, 3,255,022 and 3,255,023.

The inclusion in the curing preparation of sodium chloride sugars and spices has been mentioned. In addition other additives, generally used as pH controlling agents, may be included, and representative ones are glucona-delta-lactone (GDL), glutamic acid, fumaric acid, citric acid and sodium citrate.

Representative examples are the following:

EXAMPLE 1

A frankfurter is made of the following composition:

| | | |
|---|---|---|
| Beef chunks | lbs | 50 |
| Beef plates | lbs | 50 |
| Water or ice | lbs | 25 |
| Sodium chloride | lbs | 2.5 |
| Sodium nitrite | oz | 0.25 |
| Commercial frankfurter spice | lb | 1 |
| Sodium erythorbate | oz | 0.87 |
| Finely powdered metallic iron | oz | 0.15 |

The initial step involves chopping the lean meat, sodium chloride, sodium nitrite and at least a portion of the water or ice in the cutter until the particle size is reduced and at least a portion of the salt-soluble protein is extracted. The rest of the meat formulation, the spices, and the balance of the water or ice, if any, is then added and the chopping continued. Shortly before the end of the chopping cycle, the sodium erythorbate and the metallic iron, separately or in combination or admixture, are added and thoroughly mixed through the emulsion.

The emulsion is stuffed into suitable casings, transferred to a smoke house, and subjected to heat to cure and cook the sausage. Smoke is usually applied to impart the typical flavor to the product. Heat processing times varied from 15–35 minutes, and this is a shorter than usual curing time, which is made possible by the presence of the iron. Another feature is that with the iron in the frankfurter it is possible to use a higher curing temperature and thereby accomplish the cure in an even shorter heating time. It will be found that a complete cure is effected and that the frankfurter is of excellent quality and flavor without a noticeable taste of iron.

Following the heat process, the frankfurters are cold showered and placed in the 35–40° F. cooler to chill before being packaged.

EXAMPLE 2

Example 1 is carried out but for the meat is substituted:

| | Lbs. |
|---|---|
| Beef trimmings | 60 |
| Regular pork trimmings | 40 |

EXAMPLE 3

Example 1 is carried out but for the meat is substituted:

| | Lbs. |
|---|---|
| Beef chucks | 40 |
| Lean pork trimmings | 40 |
| Pork fat back | 20 |

EXAMPLE 4

Example 1 is carried out but for the meat is substituted:

| | Lbs. |
|---|---|
| Beef chucks | 50 |
| Regular pork trimmings | 50 |

EXAMPLE 5

Example 1 is carried out but for the meat is substituted:

| | Lbs. |
|---|---|
| Beef chucks | 30 |
| Veal trimmings | 20 |
| Regular pork trimmings | 50 |

EXAMPLE 6

Example 1 is carried out but for the meat is substituted:

| | Lbs. |
|---|---|
| Beef trimmings | 40 |
| Mutton | 10 |
| Regular pork trimmings | 50 |

EXAMPLE 7

Example 1 is carried out but for the meat is substituted:

| | Lbs. |
|---|---|
| Beef chucks | 40 |
| Boneless chicken meat | 15 |
| Regular pork trimmings | 45 |

EXAMPLE 8

Instead of the finely powdered metallic iron of Example 1, it is possible to use iron salts in an amount which contains elemental iron in the wide range or preferred range set forth above based on the weight of the meat. To illustrate this the following is a list of representative salts and their preferred ranges, it being understood that the actual amount may be greater or less within the percentage range for the equivalent amount of elemental iron.

| | Oz. |
|---|---|
| Ferrous fumarate | 0.05–0.5 |
| Ferrous sulphate ($FeSO_4 \cdot 7H_2O$) | 0.07–0.7 |
| Ferrous gluconate | 0.12–1.2 |
| Ferric ortho phosphate ($FePO_4 \cdot 3H_2O$) | 0.06–0.55 |
| Ferric chloride ($FeCl_3 \cdot 6H_2O$) | 0.06–0.6 |

EXAMPLE 9

The effect of adding to curing solutions of the type used in the "wet curing" or "pickle curing" of hams, etc., is shown in the following test:

A "pickling" solution was made up according to a formula published in Food Research, 8, 78–87 (1943), except that 0.3% of weight of ferrous sulfate replaces that amount of water. In addition, sodium erythorbate or another meat-curing reducing agent is added to the solution in accordance with the present invention.

| | Percent by weight |
|---|---|
| NaCl | 24.00 |
| Sucrose | 9.00 |
| $NaNO_3$ | 0.49 |
| $NaNO_2$ | 0.57 |
| Water | 65.64 |
| Ferrous sulphate | 0.30 |

Pieces of pork tenderloin about 1 cubic inch in size were separately immersed in the pickling liquors and the curing samples placed in the refrigerator at 4° C.

The results of this test show that the addition of iron to the "wet" curing solutions markedly increased the rate of curing of pork cubes.

Example 9 describes a pickling solution containing ferrous sulfate in a concentration such that when used at the rate of 10% by weight of the meat the ferrous sulfate would constitute 0.03% by weight of the meat to be treated. The elemental iron content, therefore, amounts to about 0.006% by weight of the meat. The same percentage ratio set forth above applies in this pickle curing process as the iron content may be within the range of 0.0002% to 0.05% of the weight of the meat and preferably 0.002% to 0.02%. Adjustment of the actual amount is most readily made by decreasing or increasing the concentration of the ferrous sulfate (and thereby increasing or decreasing the percentage amount of the water) in the pickling solution of Example 9.

The amounts of sodium nitrate, sodium nitrite, ascorbic acid or other conventional reducing agent, salt, sugar and spices are the same amounts used in accordance with standard commercial practices. For instance, in Example 1, sodium nitrate may be added to give a mixed cure.

The invention also contemplates compositions which include mixtures of any one or more of a suitable elemental iron or iron salts and an enediol or diketo reducing agent with one or more of the following ingredients commonly used in curing meats: sodium chloride, potassium chloride, sodium nitrite, potassium nitrite, sodium nitrate, potassium nitrate, sugar, sugar derivatives, cereal flour, cereal derivatives, spices, spice extracts, oleo resins, seasonings, flavorings, buffers, curing adjuncts, such as glutamic acid or GDL, food phosphates, fats, oils, modified fats or oils, solvents such as water, alcohol or glycerin, alkali metals, vitamins, amino acids, proteins, hydrolyzed proteins, modified proteins, isolated proteins, flavor enhancers or modifiers, smoke flavoring preparations, coloring agents such as paprika, tomato pumice, beet extractives, artificial colors in caramel or other ingredients which could be used in the meat product. Representative compositions are the following.

EXAMPLE 10

| | Lbs. |
|---|---|
| Finely powdered metallic iron | 15 |
| Sodium erythorbate | 87 |

A measured amount of this mixture would be added to the frankfurter meat mix of Example 1 so that it replaces these substances in that example.

EXAMPLE 11

| | Lbs. |
|---|---|
| Finely powdered metallic iron | 15 |
| Sodium nitrite | 25 |

A measured amount of this mixture would be added to the frankfurter meat mix of Example 1 so that it replaces these substances in that example.

EXAMPLE 12

| | Lbs. |
|---|---|
| Finely powdered metallic iron | 15 |
| Commercial frankfurter spice | 1600 |

A measured amount of this mixture would be added to the frankfurter meat mix of Example 1 so that it replaces these substances in that example.

EXAMPLE 13

Instead of the finely powdered metallic iron in Examples 10, 11 and 12, there is added the necessary amount of an iron salt which will provide the 15 lbs. equivalent of elemental iron. The ratio between the iron and the other ingredients in the composition may vary within wide limits having in mind that the iron should amount to from 0.0002% to 0.05% of the weight of the meat and to bring the ingredient within the range commonly used for that ingredient. This applies as well if two or more ingredients commonly used in meat curing are combined with the finely powdered metallic iron or the iron salt.

EXAMPLE 14

A frankfurter is made of the following composition:

| | | |
|---|---|---|
| Beef round | lb | 10 |
| Beef chuck | lb | 10 |
| Pork butts | lb | 12 |
| Pork fat | lb | 8 |
| Water | lb | 13 |
| Commercial frankfurter spice | g | 200 |
| Sodium nitrate | g | 2.8 |
| Salt | g | 546 |
| Monosodium glutamate | g | 22.6 |

The initial step involves chopping the lean meat, sodium chloride, sodium nitrite and at least a portion of the water or ice in the cutter until the particle size is reduced and at least a portion of the salt-soluble protein is extracted. The rest of the meat formulation, the spices and the balance of the water or ice, if any, is then added and the chopping continued. Shortly before the end of the chopping cycle, the emulsion is subdivided into 10-lb. batches, and each of the batches is further treated by addition of the indicated ingredients for purposes of comparison.

| | G. |
|---|---|
| Batch No. 1— | |
| Sodium erythorbate | 7.95 |
| Batch No. 2— | |
| Sodium erythorbate | 7.95 |
| Ferrous sulfate heptahydrate | 1.46 |
| Batch No. 3— | |
| Sodium erythorbate | 7.95 |
| Ferrous sulfate heptahydrate | 1.46 |
| Vitamin $B_1$ | 0.026 |
| Vitamin $B_2$ phosphate | 0.044 |
| Niacinamide | 0.330 |
| Batch No. 4— | |
| Ferrous sulfate heptahydrate | 1.46 |

The emulsion is stuffed into suitable casings, transferred to a smoke house, and subjected to heat to cure and cook the sausage. Smoke is usually applied to impart the typical flavor to the product. Heat processing times varied from 15–35 minutes, and this is a shorter than usual curing time which is made possible by the presence of the iron. Another feature is that with the iron in the frankfurter it is possible to use a higher curing temperature and thereby accomplish the cure in an even shorter heating time. It will be found that a complete cure is effected and that the frankfurter is of excellent quality and flavor without a noticeable taste of iron.

Following the heat process, the frankfurters are cold showered and placed in the 35–40° F. cooler to chill before being packaged.

The batches are compared by measuring the depth of color development in the cured sausage. Surprisingly, the development of color in batches 2 and 3 is greater than in batch 1. Ordinarily, the development of color is retarded in areas where the water used contains a higher than usual concentration of iron.

Color development cure:

| | Depth of color (mm.) |
|---|---|
| Batch No. 1— | |
| Sodium erythorbate | 10 |
| Batch No. 2— | |
| Sodium erythorbate and ferrous sulfate | 12 |
| Batch No. 3— | |
| Sodium erythorbate, ferrous sulfate and vitamins | 12 |
| Batch No. 4— | |
| Ferrous sulfate | a 6 | a Pale.

We claim:

1. In the process of curing meats with a nitric oxide curing medium and an enediol or a diketone reducing agent, the improvement which comprises adding from 0.0002% to 0.05% of iron represented as elemental iron based on the weight of the meat whereby the elemental iron, in the presence of the enediol or diketone reducing agent, serves to accelerate the development of the cure color in the meat.

2. The process according to claim 1 in which powdered elemental iron is added.

3. The process according to claim 1 in which the iron is added in the range of 0.002% to 0.02%.

4. The process according to claim 1 in which said iron is added in the form of an aqueous solution of a water soluble iron salt.

References Cited

UNITED STATES PATENTS

| 2,739,899 | 3/1956 | Hollenbeck | 99—159 |
| 2,831,774 | 4/1958 | Furgal et al. | 99—159 X |

HYMAN LORD, Primary Examiner

U.S. Cl. X.R.

426—332